(12) United States Patent
Feldkamp et al.

(10) Patent No.: US 11,955,830 B2
(45) Date of Patent: Apr. 9, 2024

(54) BATTERY TEMPERATURE BASED TOOL POWER REDUCTION

(71) Applicant: TECHTRONIC CORDLESS GP, Anderson, SC (US)

(72) Inventors: Jonathan R. Feldkamp, Anderson, SC (US); Grzegorz Kondro, Piedmont, SC (US); Colin W. Hines, Easley, SC (US); Mathew Tang, Central, SC (US); Nikolas F. Mika, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 163 days.

(21) Appl. No.: 17/728,538

(22) Filed: Apr. 25, 2022

(65) Prior Publication Data

US 2022/0344961 A1 Oct. 27, 2022

Related U.S. Application Data

(60) Provisional application No. 63/180,409, filed on Apr. 27, 2021.

(51) Int. Cl.
*B25B 21/02* (2006.01)
*B25F 5/00* (2006.01)
(Continued)

(52) U.S. Cl.
CPC .......... *H02J 7/007194* (2020.01); *B25F 5/00* (2013.01); *G01K 3/005* (2013.01);
(Continued)

(58) Field of Classification Search
CPC ...... H02P 3/22; H02P 29/68; H02J 7/007194; H01M 50/247; H01M 10/441;
(Continued)

(56) References Cited

U.S. PATENT DOCUMENTS 7,157,883 B2 1/2007 Johnson et al.
7,990,109 B2 8/2011 White et al.
(Continued)

FOREIGN PATENT DOCUMENTS

CN 205283173 U 6/2016
DE 102010062441 A1 6/2012
(Continued)

OTHER PUBLICATIONS

Extended European Search Report for Application No. 22169768.3 dated Jan. 27, 2023 (11 pages).

*Primary Examiner* — Cortez M Cook
(74) *Attorney, Agent, or Firm* — Michael Best & Friedrich LLP

(57) ABSTRACT

A power tool system including a battery pack and a power tool. The power tool includes a power tool housing, a drive unit located within the housing, and a power tool controller located within the housing. The power tool controller is configured to receive a signal from the battery pack (for example, a battery pack controller), the signal indicative of a temperature (for example, a temperature of the battery pack); determine whether the temperature is between a lower temperature threshold and an upper temperature threshold; and limit a power to a drive unit if the temperature is between the lower temperature threshold and the upper temperature threshold.

17 Claims, 5 Drawing Sheets

(51) Int. Cl.
  *G01K 3/00* (2006.01)
  *H01M 10/44* (2006.01)
  *H01M 10/48* (2006.01)
  *H01M 50/247* (2021.01)
  *H02J 7/00* (2006.01)
  *H02P 29/68* (2016.01)

(52) U.S. Cl.
  CPC ....... *H01M 10/441* (2013.01); *H01M 10/443* (2013.01); *H01M 10/482* (2013.01); *H01M 10/486* (2013.01); *H01M 50/247* (2021.01); *H02P 29/68* (2016.02); *H01M 2220/30* (2013.01)

(58) Field of Classification Search
  CPC ............. H01M 10/443; H01M 10/482; H01M 10/486; H01M 2220/30; B25F 5/00
  See application file for complete search history.

(56) References Cited

U.S. PATENT DOCUMENTS

| | | | |
|---|---|---|---|
| 8,084,981 B2 | 12/2011 | Miwa et al. | |
| 8,344,675 B2 | 1/2013 | Miwa et al. | |
| 8,446,120 B2 | 5/2013 | Forster et al. | |
| 8,653,787 B2 | 2/2014 | Cunanan et al. | |
| 8,796,995 B2 | 8/2014 | Cunanan et al. | |
| 8,885,307 B2 | 11/2014 | Kobayakawa et al. | |
| 8,940,427 B2 | 1/2015 | Noda et al. | |
| 8,988,015 B2 | 3/2015 | Forster et al. | |
| 9,000,882 B2 | 4/2015 | Velderman et al. | |
| 9,071,069 B2 | 6/2015 | Brotto et al. | |
| 9,186,787 B2 | 11/2015 | Noda et al. | |
| 9,203,249 B2 | 12/2015 | Noda et al. | |
| 9,209,642 B2 | 12/2015 | Cunanan et al. | |
| 9,225,275 B2 | 12/2015 | Sterling et al. | |
| 9,401,250 B2 | 7/2016 | Velderman et al. | |
| 9,406,457 B2 | 8/2016 | Velderman et al. | |
| 9,413,088 B2 | 8/2016 | Brotto et al. | |
| 9,444,269 B2 | 9/2016 | Wohltmann et al. | |
| 9,461,379 B2 | 10/2016 | Cunanan et al. | |
| 9,508,498 B2 | 11/2016 | Forster et al. | |
| 9,570,822 B2 | 2/2017 | Cunanan et al. | |
| 9,692,157 B2 | 6/2017 | Brotto et al. | |
| 9,722,334 B2 | 8/2017 | Sterling et al. | |
| 9,853,586 B2 | 12/2017 | Kusakawa et al. | |
| 9,941,553 B2 | 4/2018 | Umemura et al. | |
| 9,960,509 B2 | 5/2018 | Sterling et al. | |
| 9,966,774 B2 | 5/2018 | Wohltmann et al. | |
| 10,027,140 B2 | 7/2018 | Cunanan et al. | |
| 10,177,559 B2 | 1/2019 | Uesugi et al. | |
| 10,177,691 B2 | 1/2019 | Eshleman et al. | |
| 10,256,697 B2 | 4/2019 | Velderman et al. | |
| 10,298,044 B2 | 5/2019 | Ito et al. | |
| 10,603,777 B2 | 3/2020 | Palich et al. | |
| 10,651,706 B2 | 5/2020 | Forster et al. | |
| 10,666,068 B2 | 5/2020 | Cunanan et al. | |
| 10,686,319 B2 | 6/2020 | Wohltmann et al. | |
| 10,784,676 B2 | 9/2020 | Uesugi et al. | |
| 10,886,764 B2 | 1/2021 | Kawano et al. | |
| 2006/0119324 A1 | 6/2006 | Kim | |
| 2007/0193762 A1 | 8/2007 | Arimura et al. | |
| 2012/0274245 A1 | 11/2012 | Takano et al. | |
| 2013/0108904 A1 | 5/2013 | Okabayashi | |
| 2014/0131059 A1* | 5/2014 | Verbrugge | B25B 21/02 173/217 |
| 2014/0232326 A1 | 8/2014 | Wohltmann et al. | |
| 2015/0084554 A1 | 3/2015 | Tsuruta et al. | |
| 2016/0056655 A1 | 2/2016 | Kaneda et al. | |
| 2018/0013360 A1* | 1/2018 | Eshleman | H02P 3/22 |
| 2019/0321961 A1 | 10/2019 | Palich et al. | |
| 2020/0176834 A1 | 6/2020 | Murakami et al. | |
| 2020/0180134 A1 | 6/2020 | Palich et al. | |
| 2020/0212505 A1 | 7/2020 | Nakano et al. | |
| 2020/0235638 A1 | 7/2020 | Velderman | |
| 2020/0287398 A1 | 9/2020 | Delose et al. | |
| 2020/0295579 A1 | 9/2020 | Wohltmann et al. | |
| 2020/0395641 A1 | 12/2020 | Suzuki et al. | |

FOREIGN PATENT DOCUMENTS

| | | |
|---|---|---|
| DE | 102015208252 A1 | 11/2016 |
| DE | 102017216236 A1 | 3/2019 |
| EP | 3663051 A1 | 6/2020 |
| WO | 2013041927 A1 | 3/2013 |
| WO | 2014038165 A1 | 3/2014 |
| WO | 2019037793 A1 | 2/2019 |

\* cited by examiner

BATTERY TEMPERATURE BASED TOOL POWER REDUCTION

RELATED APPLICATIONS

This application claims the benefit and priority to U.S. Provisional Patent Application No. 63/180,409, filed on Apr. 27, 2021, the entire contents of which are incorporated herein by reference.

FIELD

Embodiments described herein provide battery pack powered power tools.

SUMMARY

Devices, such as power tools, may be configured to receive power from a battery pack electrically coupled to the power tool. The coupled battery pack may have a thermal limit for an internal temperature of the battery pack. Above this thermal limit, the health and performance of the battery pack may be compromised. As power tools push the limits of continuous power, the thermal limits of battery packs may be encountered more frequently. Some power tools may not be able to deliver a full discharge of a battery pack before hitting the thermal limit. Therefore, it would be advantageous to provide a power tool with a power consumption reduction method based on a temperature of a battery pack electrically coupled to the power tool. Such a method would allow a user to utilize the power tool and battery pack at their most ideal capability. In some embodiments, the battery pack may include a communication interface through which the battery pack can communicate with the power tool. This would allow the power tool to receive a temperature of the battery pack at constant intervals.

Embodiments described herein provide a device, such as a power tool. The power tool includes a housing having a handle and a battery pack interface. The power tool includes a motor (e.g., a brushless direct current motor) within the housing. The motor includes a rotor and a stator. The rotor is coupled to a motor shaft to provide a rotational output. The rotational output may be used to rotate a fan of a turbine, a rotating tool end, and/or a rotating cutting device, and/or the rotational output may be coupled to a reciprocating device to convert rotational motion into rectilinear motion. In another embodiment, the power tool may include a solenoid. The solenoid may not include a rotor. However, the solenoid may operate with windings in a similar way to that of the motor. In another embodiment, the power tool may not include a motor. Rather, in such an embodiment, the power tool may include, or be, a power inverter. For example, a power inverter configured to convert direct-current (DC) power to alternating-current (AC) power (for example, 110V AC power).

The battery pack interface includes at least one electrode terminal for receiving power from a battery pack, and at least one communication terminal for receiving data from the battery pack. The power tool further includes a power tool controller located within the housing. The power tool controller includes a processor and a memory. The power tool controller is configured to send a request to the battery pack via the communication terminal at intervals (for example, variable intervals, fixed intervals, predetermined intervals, etc.). The request may be a request to receive a temperature. The power tool controller is further configured to receive a signal from the battery pack via the communication terminal of the battery pack interface. The signal may be indicative of the temperature. The power tool controller is further configured to determine whether the temperature is between a lower temperature threshold and an upper temperature threshold. The power tool controller is further configured to control or limit a supply of power to the motor if the temperature is between the lower temperature threshold and the upper temperature threshold. The limiting of the supply of power to the motor may be based on a linear scaling operation if the temperature is between the lower temperature threshold and the upper temperature threshold. The power tool controller is further configured to not limit a supply of power to the motor if the temperature is less than the lower temperature threshold. The power tool controller is further configured to limit the supply of power to the motor to a predetermined maximum limit if the temperature is greater than or equal to the upper temperature limit. The predetermined maximum limit may be greater than one-half of a maximum power of the power tool. In some embodiments, the power tool is one selected from a group of a blower, a drill, an impact driver, a reciprocating saw, a circular saw, an angle grinder, a lawn mower, and the like.

Embodiments described herein also provide a device, such as a battery pack. The battery pack includes a housing having a power tool interface. The battery pack includes one or more cells located within the housing. The battery pack includes at least one sensor configured to sense a temperature within the battery pack housing. The temperature sensor may be one selected from a group of a negative temperature coefficient (NTC) thermistor, a thermocouple, a resistance temperature detector (RTD), a thermistor, a semiconductor based integrated circuit, and the like. The power tool interface includes at least one electrode terminal for supplying power to a power tool, and at least one communication terminal for supplying data to the power tool. The battery pack further includes a battery pack controller located within the housing. The battery pack controller is configured to receive a request from the power tool via the communication terminal of the power tool interface. The request maybe a request to supply a temperature. The battery pack controller is further configured to receive a first signal from the temperature sensor. The signal may be indicative of a temperature. The battery pack controller is further configured to supply a second signal to the power tool via the communication terminal of the power tool interface. The second signal may be indicative of a temperature. The second signal may then be used by the power tool to control or limit a supply of power to the motor based on the second signal.

Before any embodiments are explained in detail, it is to be understood that the embodiments are not limited in its application to the details of the configuration and arrangement of components set forth in the following description or illustrated in the accompanying drawings. The embodiments are capable of being practiced or carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
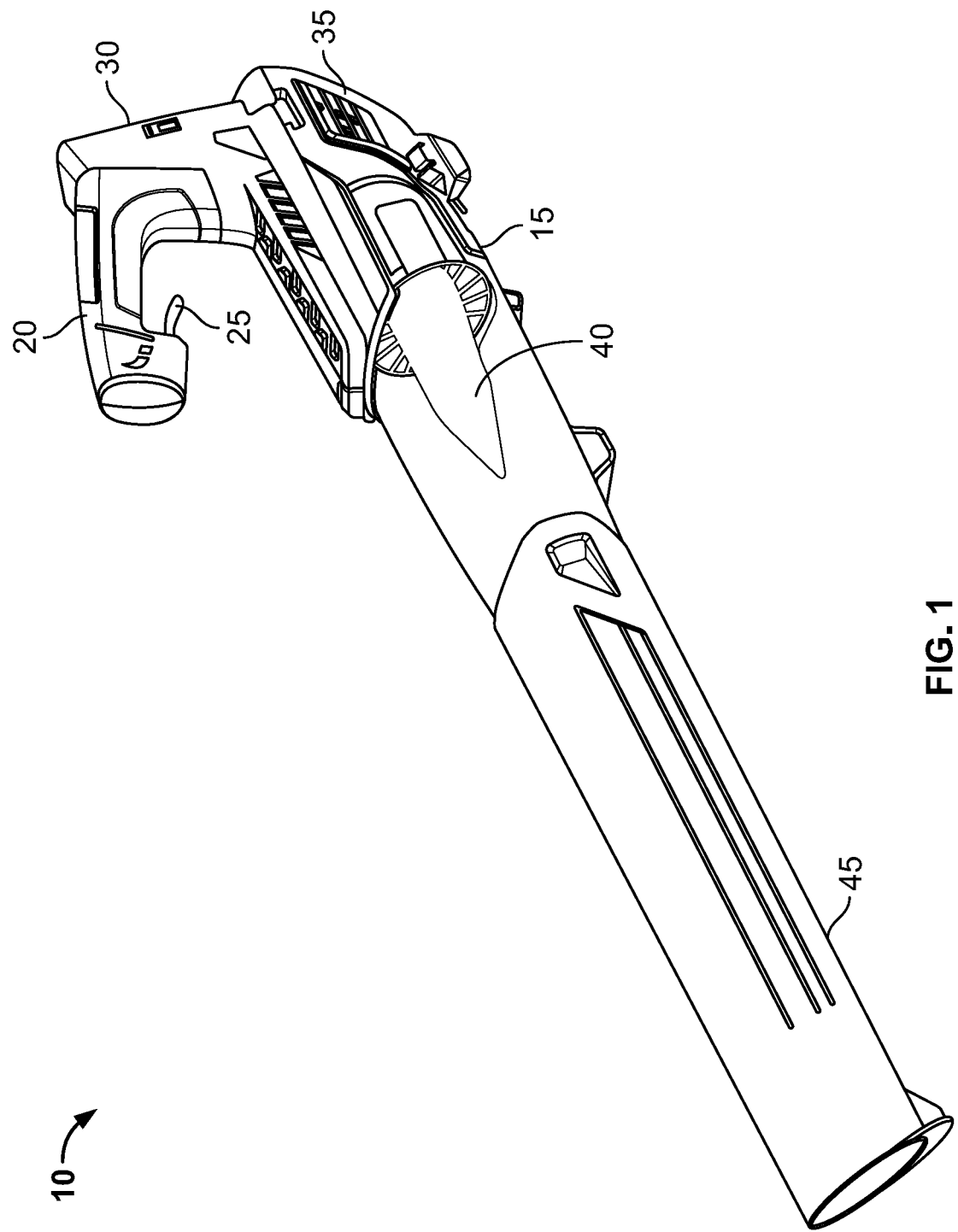
FIG. 1 illustrates a power tool according to embodiments described herein.

FIG. 1 illustrates a power tool 10 according to some embodiments. The power tool 10 includes a power tool housing 15. The power tool 10 may also include a handle 20 formed from the power tool housing 15 and a trigger 25 mounted on the handle 20. The power tool housing 15 further comprises a battery pack interface 30. The battery pack interface 30 includes at least one terminal for electrically and/or communicatively interfacing with a battery pack (illustrated in FIG. 2). A motor 35 is located inside the power tool housing 15. The motor 35 includes a rotor and a stator (not shown). The rotor may be coupled to a turbine 40 configured to rotate and move air in a direction parallel to the rotor. The power tool housing 15 may be coupled to a tube 45 configured to direct air moved by the turbine 40 in a direction parallel to the rotor. In some embodiments, the tube 45 is formed from the power tool housing 15. In other embodiments, the tube 45 is formed separate to the power tool housing 15 and attached to the power tool housing 15 by one or more fasteners. Although illustrated as including a motor 35, embodiments herein may include a drive unit, which may be, but is not limited to, the motor 35, a solenoid, and/or a power inverter.

Figure 2:
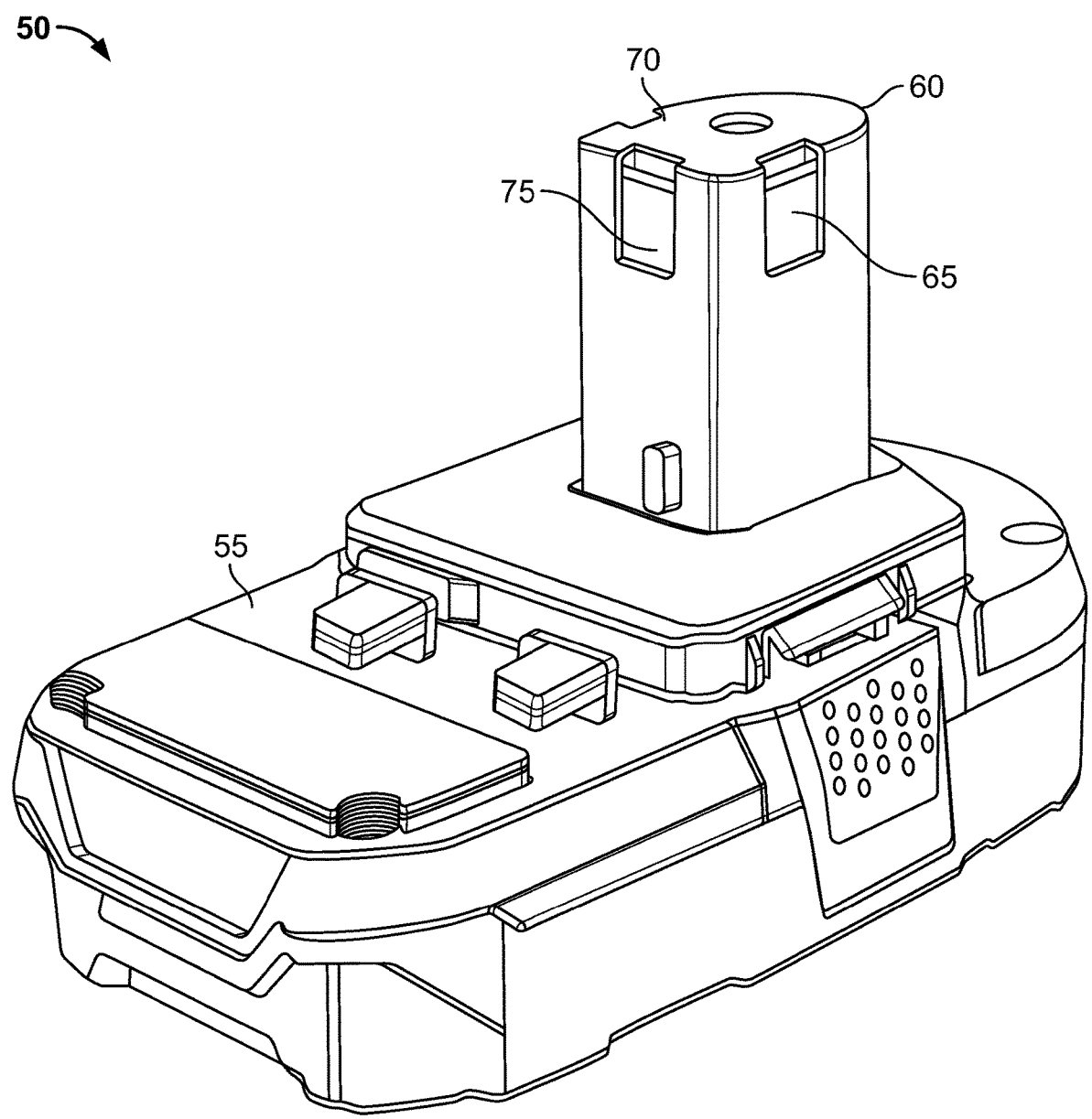
FIG. 2 illustrates a battery pack according to embodiments described herein.

FIG. 2 illustrates a battery pack 50. The battery pack 50 includes a battery pack housing 55. The battery pack housing 55 includes a power tool interface 60. Although illustrated as a "stem-type" battery pack, in other embodiments, the battery pack may be a "rail-type" battery pack. In the illustrated embodiment, the power tool interface 60 is extruded in a direction generally orthogonal to a plane of the battery pack housing 55. The power tool interface 60 is configured to electrically and communicatively couple to the battery pack interface 30 of the power tool 10. The power tool interface 60 includes a positive power supply terminal 65 and a negative power supply terminal 70. The power tool interface 60 may further include one or more battery-side communication terminals 75.

Figure 3:
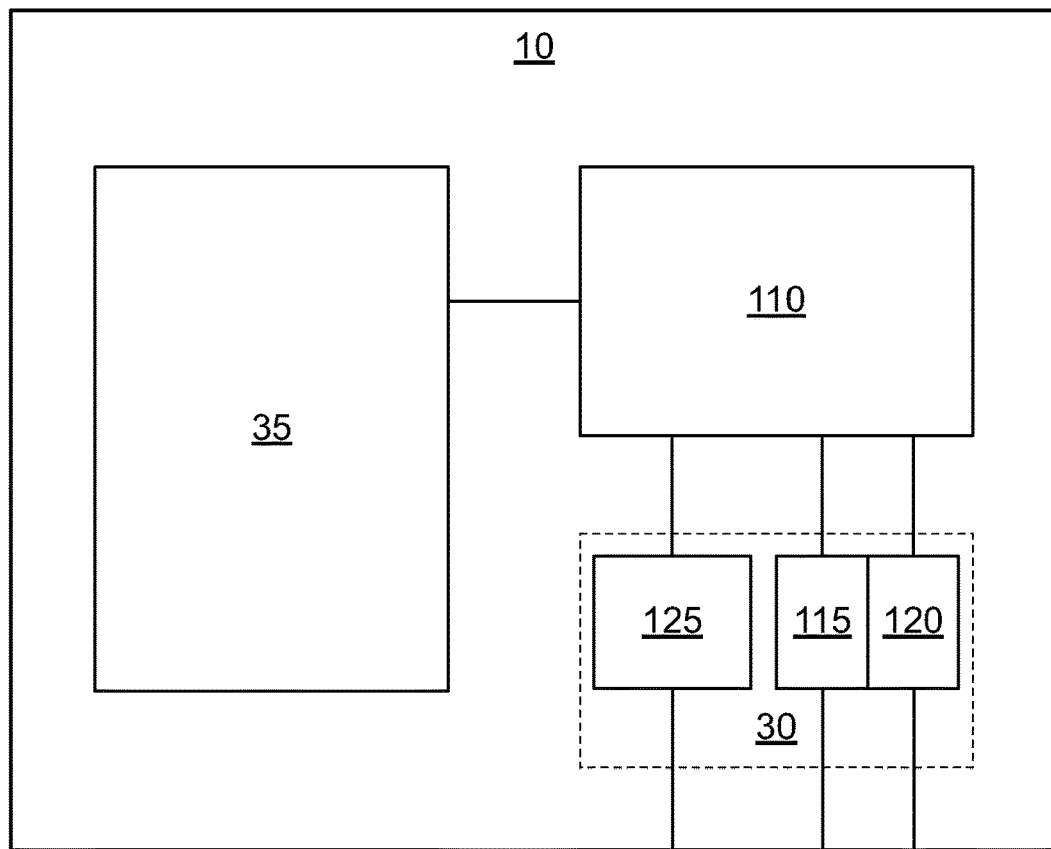
FIG. 3 is a block diagram of a power tool system including a power tool and a battery pack according to embodiments described herein.
Figure 3:
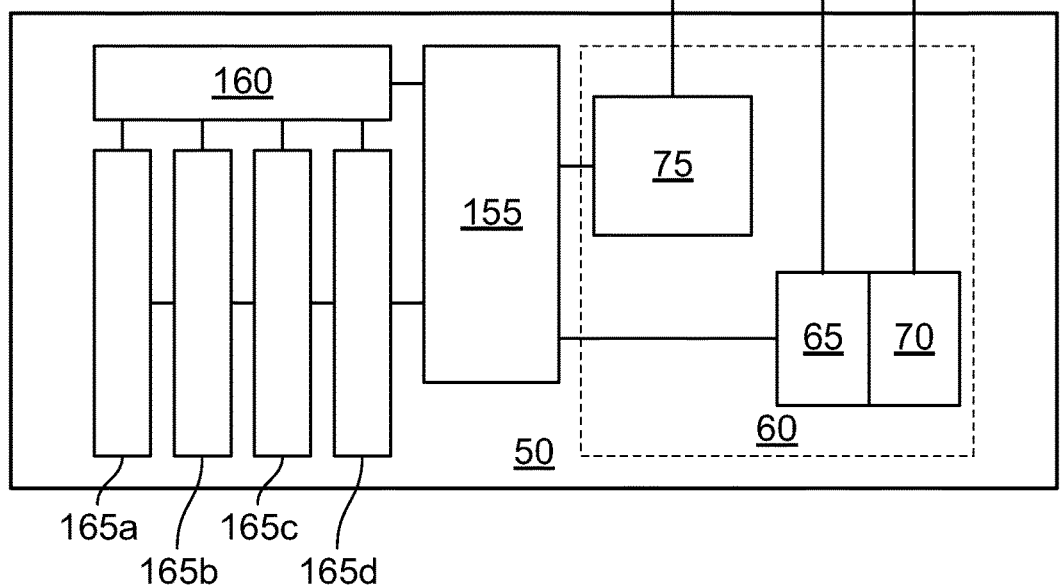

FIG. 3 is a block diagram of a power tool system 100 including a power tool 10 and a battery pack 50. The power tool 10 includes a battery pack interface 30, a drive unit (for example, motor 35, a solenoid, and/or a power inverter), and a power tool controller 110. The battery pack interface 30 is configured to electrically, communicatively, and/or mechanically couple to the power tool interface 60 of the battery pack 50. In the illustrated embodiment, the battery pack interface 30 includes a positive power receiving terminal 115, a negative power receiving terminal 120, and a tool-side communication terminal 125. The positive power receiving terminal 115 and the negative power receiving terminal 120 receive power from the battery pack 50 and supply power to various components of the power tool 10. The tool-side communication terminal 125 is configured to send and/or receive one or more signals from the battery pack 50. The power tool controller 110 is configured to analyze the signal received from the tool-side communication terminal 125 and control to the tool 10 (for example, the drive unit (for example, motor 35, a solenoid, and/or a power inverter)).

The battery pack 50 includes a power tool interface 60, a battery pack controller 155, a temperature sensor 160, and one or more battery cells 165. The temperature sensor 160 is configured to sense a temperature within the battery pack 50 (for example, a temperature of one or more battery cells 165 and/or an ambient temperature within the battery pack housing 55) and generate a first signal indicative of a temperature of the battery pack 50. The battery pack controller 155 is configured to receive the first signal from the temperature sensor 160 and send a second signal to the battery-side communication terminal 75. The power tool interface 60 is configured to electrically, communicatively, and/or mechanically couple to the battery pack interface 30 of the power tool 10. The power tool interface 60 includes a positive power supply terminal 65, a negative power supply terminal 70, and a battery-side communication terminal 75. The positive power supply terminal 65 and negative power supply terminal 70 supply power to the power tool 10. The battery-side communication terminal 75 is configured to receive a signal from the battery pack controller 155 and send the signal to the power tool 10.

In some embodiments, such as the block diagram of FIG. 3, the temperature sensor 160 is coupled to one or more battery cells 165. In other embodiments, the temperature sensor 160 is coupled to one or more other components within the battery pack 50.

In some embodiments, such as the block diagram of FIG. 3, the one or more battery cells 165 are electrically connected to each other in a series-type manner. However, in other embodiments, the one or more battery cells 165 are electrically connected to each other in a parallel-type manner. In other embodiments, the one or more battery cells 165 are electrically connected to each other in a combination of a series-type and a parallel-type manner.

In some embodiments, such as the block diagram of FIG. 3, the one or more battery cells 165 are connected to the battery pack controller 155. The battery pack controller 155 controls the power delivered to the positive power supply terminal 65 and the negative power supply terminal 70 (for example, via control of a discharge field-effect transistor (FET), a charge FET, and/or other FETs located within the battery pack housing 55). In some embodiments, the battery pack controller 155 control the power by allowing or prohibiting power. Additionally, in some embodiments, the battery pack controller 155 controls the power by allowing a percentage of power generated by the one or more battery cells 165 to be output. In some embodiments, the amount of power delivered to the positive power supply terminal 65 is approximately 100% of power possibly generated by the one or more battery cells 165.

Figure 4:
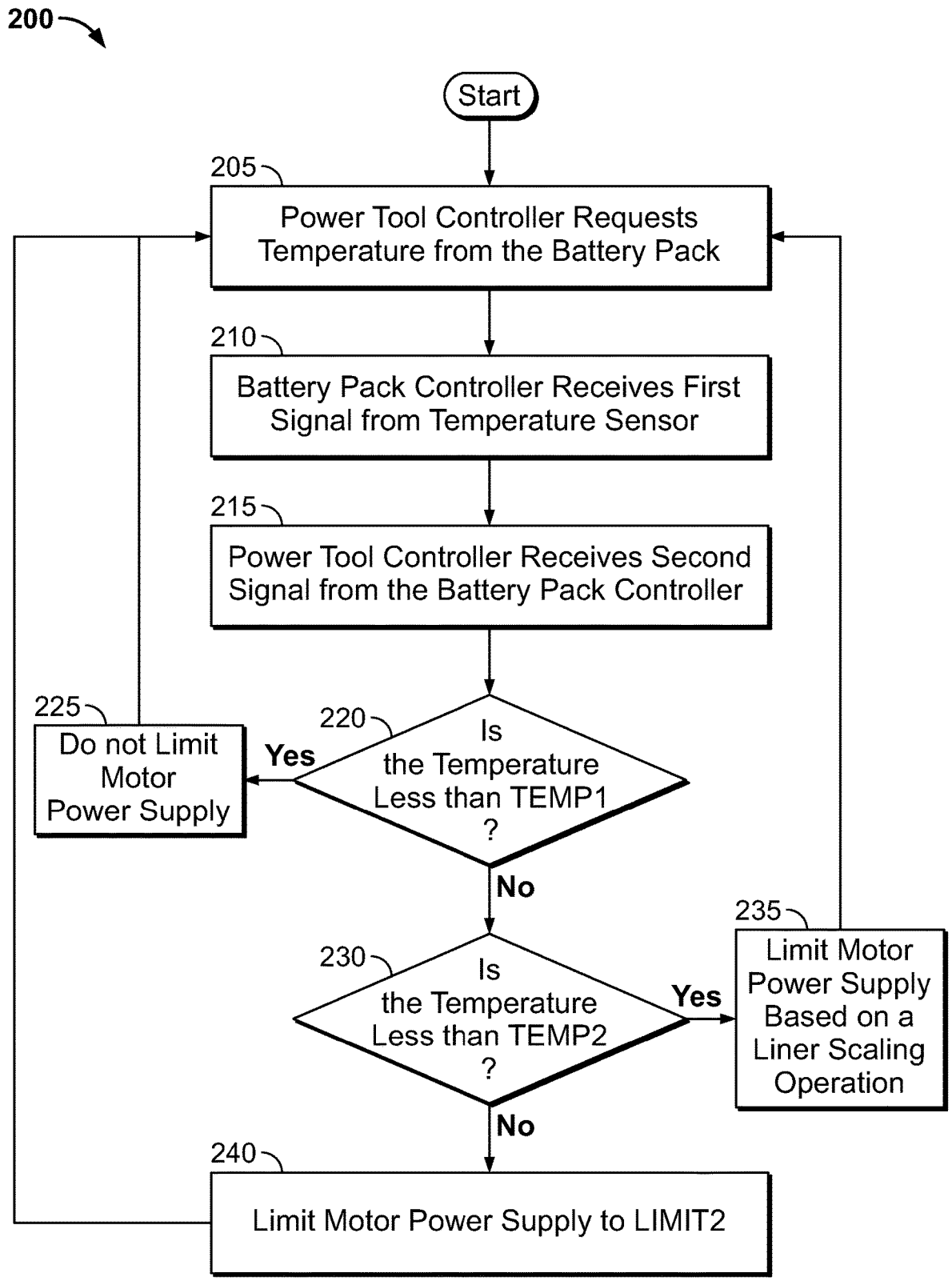
FIG. 4 is a flow chart of a battery-temperature-based tool power reduction method according to embodiments described herein.

FIG. 4 is a flow chart illustrating a battery-temperature-based tool power reduction method 200 according to some embodiments. It should be understood that the order of the steps disclosed in the method 200 could vary. For example, additional steps may be added to the process and not all of the steps may be required, or steps shown in one order may occur in a second order. Upon an activation of the power tool 10, the method 200 begins. The method 200 includes sending, by the power tool controller 110, a request to the battery pack controller 155 (BLOCK 205). The request is a request for a temperature of the battery pack 50. The request is sent via the tool-side communication terminal 125 in communication with the battery-side communication terminal 75. In some embodiments, the power tool controller 110 may send the request at intervals (for example, variable intervals, fixed intervals, predetermined intervals, etc.). In some embodiments, rather than requesting the battery pack controller 155, the method 200 may proceed directly from START to block 210.

The method 200 further includes receiving, by the battery pack controller 155, a first signal from the temperature sensor 160 (BLOCK 210). The first signal is indicative of a temperature of the battery pack 50. The battery pack controller 155 generates a second signal based on the received first signal.

The method 200 further includes receiving, by the power tool controller 110, the second signal from the battery pack controller 155 (BLOCK 215). The second signal is indicative of a temperature of the battery pack 50. The second signal is received via the tool-side communication terminal 125 in communication with the battery-side communication terminal 75.

The method 200 further includes determining, with the power tool controller 110, whether the temperature of the battery pack 50 is less than a lower temperature threshold (TEMP1) (BLOCK 220). If the temperature of the battery pack 50 is less than the lower temperature threshold (TEMP1), the method 200 further includes not limiting, by the power tool controller 110, the supply of power to the drive unit (for example, motor 35, a solenoid, and/or a power inverter) (BLOCK 225). For example, the power tool controller 110 supplies an amount of power to the drive unit (for example, motor 35, a solenoid, and/or a power inverter) that is a maximum amount of power for the power tool 10. If the temperature of the battery pack 50 is less than the lower temperature threshold (TEMP1), the method 200 returns to BLOCK 205 following BLOCK 225. Otherwise, the method 200 continues to BLOCK 230.

If the temperature of the battery pack 50 is greater than or equal to the lower temperature threshold (TEMP1), the method 200 further includes determining, with the power tool controller 110, whether the temperature of the battery pack 50 is less than an upper temperature threshold (TEMP2) (BLOCK 230). If the temperature of the battery pack 50 is greater than or equal to the lower temperature threshold (TEMP1), but less than the upper temperature threshold (TEMP2), the method 200 further includes limiting, by the power tool controller 110, the supply of power available to the drive unit (for example, motor 35, a solenoid, and/or a power inverter) based on a linear scaling operation (BLOCK 235). For example, the power tool controller 110 supplies an amount of power to the drive unit (for example, motor 35, a solenoid, and/or a power inverter) that is less than a maximum amount of power for the power tool 10, but greater than a maximally limited power (LIMIT2). In some embodiments, while the power tool controller 110 changes the amount of power supplied to the drive unit (for example, motor 35, a solenoid, and/or a power inverter), the amount of power supplied to the drive unit (for example, motor 35, a solenoid, and/or a power inverter) is changed slowly to avoid alerting the user of the change. If the temperature of the battery pack 50 is greater than or equal to the lower temperature threshold (TEMP1), but less than the upper temperature threshold (TEMP2), the method 200 returns to BLOCK 205 following BLOCK 235. Otherwise, the method 200 continues to BLOCK 240.

If the temperature of the battery pack 50 is greater than or equal to the upper temperature threshold (TEMP2), the method 200 further includes limiting, by the power tool controller 110, the supply of power available to the drive unit (for example, motor 35, a solenoid, and/or a power inverter) to a predetermined maximally limited power (LIMIT2) (BLOCK 240). For example, the supply of power available to the drive unit (for example, motor 35, a solenoid, and/or a power inverter) will be limited to the maximally limited power (LIMIT2) regardless of the value by which the temperature of the battery pack 50 exceeds the upper temperature threshold (TEMP2). In some embodiments, the maximally limited power (LIMIT2) is greater than one-half of a maximum amount of power for the power tool 10. For example, the maximally limited power (LIMIT2) may be approximately 85% of the maximum amount of power for the power tool. The method 200 returns to BLOCK 205 following BLOCK 240. The method 200 continues in this fashion until the power tool 10 is deactivated.

In some embodiments, the supply of power to the drive unit (for example, motor 35, a solenoid, and/or a power inverter) is directly controlled by the trigger 25 based on an amount of displacement of the trigger 25. The supply of power to the drive unit (for example, motor 35, a solenoid, and/or a power inverter) may then be scaled based on the method 200 and the amount of displacement of the trigger 25. For example, in one embodiment, when a temperature of the battery pack 50 is below a lower temperature threshold, the supply of power delivered to the motor will be between 0% and 100% of a maximum power of the power tool 10, based on an amount of displacement of a trigger 25 of the power tool 10. When the temperature of the battery pack 50 is halfway between the lower temperature threshold and an upper temperature threshold, the supply of power available to the drive unit (for example, motor 35, a solenoid, and/or a power inverter) may be limited based on a linear scaling operation (e.g., 92.5% of the maximum power of the power tool 10). At this point, the supply of power delivered to the motor will be between 0% and 92.5% of the maximum power of the power tool 10, based on an amount of displacement of the trigger 25. When the temperature of the battery pack 50 is above the upper temperature threshold, the supply of power available to the drive unit (for example, motor 35, a solenoid, and/or a power inverter) may be limited to a maximally limited power (e.g., 85% of the maximum power of the power tool 10). At this point, the supply of power delivered to the drive unit (for example, motor 35, a solenoid, and/or a power inverter) will be between 0% and 85% of the maximum power of the power tool 10, based on an amount of displacement of the trigger 25.

In some embodiments, additional temperature thresholds may be included. The scaling operation may be different between these additional temperature thresholds. For example, one embodiment may include a lower temperature threshold, an intermediate temperature threshold, and an upper temperature threshold. Between the lower temperature threshold and the intermediate temperature threshold, the scaling operation may be a linear scaling operation with a first slope. Between the intermediate temperature threshold and the upper temperature threshold, the scaling operation may be a linear scaling operation with a second slope, greater than the first slope.

Figure 5:
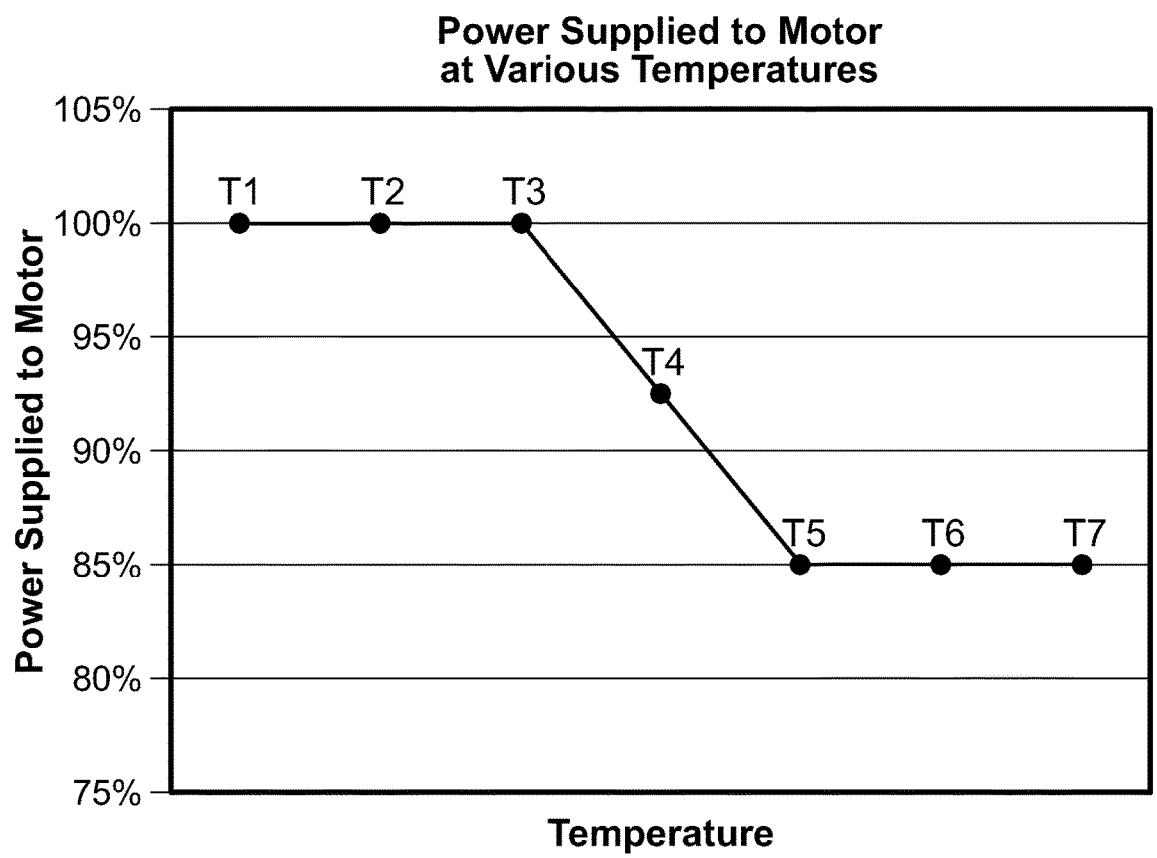
FIG. 5 is a graph of power supplied to a motor of a power tool employing a battery-temperature-based tool power reduction method at various temperatures of a battery pack, according to embodiments described herein.

FIG. 5 illustrates a graph 300 of power supplied to a drive unit (for example, motor 35, a solenoid, and/or a power inverter) of a power tool 10 configured to execute an example battery-temperature-based tool power reduction method at difference temperatures of the battery pack 50. The x-axis illustrates varying temperatures of the battery pack 50. The interval between a set of two adjacent temperatures may not be the same as the interval between a different set of two adjacent temperatures. The y-axis illustrates a linear scale of power supplied to the drive unit (for example, motor 35, a solenoid, and/or a power inverter). The maximum amount of power for the power tool 10 in this example is approximately 100%. The maximally limited power (LIMIT2) for the power tool 10 in this example is approximately 85%.

T1 is a minimum working temperature of the battery pack 50. In some embodiments, the battery pack 50 may not operate below T1. At T1, a maximum amount of power for the power tool 10 (e.g., 100%) may be supplied to the drive unit (for example, motor 35, a solenoid, and/or a power inverter). T2 is a temperature of the battery pack 50 between the minimum working temperature of the battery pack 50 and the lower temperature threshold (TEMP1). At T2, a maximum amount of power for the power tool 10 (e.g., 100%) may be supplied to the drive unit (for example, motor 35, a solenoid, and/or a power inverter). T3 is a temperature of the battery pack 50 at the lower temperature threshold (TEMP1). At T3, an approximately maximum amount of power for the power tool 10 (e.g., 100%) may be supplied to the drive unit (for example, motor 35, a solenoid, and/or a power inverter). The approximately maximum amount of power for the power tool 10 (e.g., 100%) is determined by a linear scaling operation. T4 is a temperature of the battery pack 50 exactly half-way between the lower temperature threshold (TEMP1) and the upper temperature threshold (TEMP2). At T4, for example, an amount of power exactly halfway between the maximum power for the power tool 10 (e.g., 100%) and the maximally limited power (LIMIT2) (e.g., 85%) may be supplied to the drive unit (for example, motor 35, a solenoid, and/or a power inverter). In this example, 92.5% of the maximum amount of power for the power tool 10 may be supplied to the drive unit (for example, motor 35, a solenoid, and/or a power inverter). T5 is a temperature of the battery pack 50 at the upper temperature threshold (TEMP2). At T5, a maximally limited amount of power (LIMIT2) (e.g., 85%) may be supplied to the motor. T6 is a temperature of the battery pack 50 between the upper temperature threshold (TEMP2) and a maximum working temperature of the battery pack 50. At T6, a maximally limited amount of power (LIMIT2) (e.g., 85%) may be supplied to the motor. T7 is the maximum working temperature of the battery pack 50. The battery pack 50 may not operate above T7. At T7, a maximally limited amount of power (LIMIT2) (e.g., 85%) may be supplied to the motor. Although illustrated as a linear relationship, in other embodiments, a look-up table based relationship, an exponential relationship, an inverse relationship, a quadratic relationship, a damping motion relationship and/or a sinusoidal relationship may be used.

Thus, embodiments described herein provide, among other things, systems and methods for performing battery-temperature-based tool power reduction. Various features and advantages are set forth in the following claims.

What is claimed is:
1. A power tool system comprising:
   a battery pack including:
      a battery pack housing,
      one or more battery cells located within the battery pack housing,
      a sensor configured to sense a temperature within the battery pack housing, and
      a battery pack controller located within the battery pack housing, the battery pack controller configured to receive a first signal from the sensor, the first signal indicative of the temperature; and a power tool configured to electrically and communicatively couple to the battery pack, the power tool including:
   a power tool housing,
   a drive unit located within the housing, and
   a power tool controller located within the housing, the power tool controller configured to:
      receive a second signal from the battery pack controller, the second signal indicative of the temperature,
      determine whether the temperature is between a lower temperature threshold and an upper temperature threshold, and
      limit a drive unit power if the temperature is between the lower temperature threshold and the upper temperature threshold;
   wherein the power tool controller is further configured to not limit the drive unit power if the temperature is less than the lower temperature threshold.

2. The power tool system of claim 1, wherein the power tool controller is further configured to limit the drive unit power to a predetermined maximum limit if the temperature is greater than or equal to the upper temperature threshold.

3. The power tool system of claim 2, wherein the predetermined maximum limit is greater than one-half of a maximum power of the power tool.

4. The power tool system of claim 1, wherein the power tool controller is further configured to limit the drive unit power based on a linear scaling operation if the temperature is between the lower temperature threshold and the upper temperature threshold.

5. The power tool system of claim 1, wherein the power tool controller is further configured to request the temperature from the battery pack controller at fixed intervals.

6. The power tool system of claim 1, wherein the battery pack further includes a communication interface.

7. The power tool system of claim 1, wherein the power tool is one selected from a group consisting of a leaf blower, a drill, an impact driver, a reciprocating saw, a circular saw, an angle grinder, and a lawn mower.

8. A power tool comprising:
   a power tool housing,
   a motor located within the housing, and
   a power tool controller located within the housing, the power tool controller configured to:
      receive a signal from a battery pack electrically and communicatively coupled to the power tool, the signal indicative of a temperature of the battery pack,
      determine whether the temperature is between a lower temperature threshold and an upper temperature threshold, and
      limit a drive unit power if the temperature is between the lower temperature threshold and the upper temperature threshold;
   wherein the power tool controller is further configured to not limit the drive unit power if the temperature is less than the lower temperature threshold.

9. The power tool of claim 8, wherein the power tool controller is further configured to limit the drive unit power to a predetermined maximum limit if the temperature is greater than or equal to the upper temperature threshold.

10. The power tool of claim 9, wherein the predetermined maximum limit is greater than one-half of a maximum power of the power tool.

11. The power tool of claim 8, wherein the power tool controller is further configured to limit the drive unit power based on a linear scaling operation if the temperature is between the lower temperature threshold and the upper temperature threshold.

12. The power tool of claim 8, wherein the power tool controller is further configured to request the temperature from the battery pack at fixed intervals.

13. A method implemented on a controller of a power tool for reducing a supply of power to a drive unit of the power tool, the method comprising:
   receiving, via the controller, a signal from a battery pack electrically and communicatively coupled to the power tool, the signal indicative of a temperature of the battery pack,
   determining, via the controller, whether the temperature is between a lower temperature threshold and an upper temperature threshold, and
   limiting, via the controller, the supply of power to the drive unit if the temperature is between the lower temperature threshold and the upper temperature threshold; and
   not limiting, via the controller, the supply of power to the drive unit if the temperature is less than the lower temperature threshold.

14. The method of claim 13, further comprising limiting, via the controller, the supply of power to the drive unit to a predetermined maximum limit if the temperature is greater than or equal to the upper temperature threshold.

15. The method of claim 14, wherein the predetermined maximum limit is greater than one-half of a maximum power of the power tool.

16. The method of claim 13, further comprising limiting, via the controller, the supply of power to the drive unit based on a linear scaling operation if the temperature is between the lower temperature threshold and the upper temperature threshold.

17. The method of claim 13, further comprising requesting, via the controller, the temperature from the battery pack at fixed intervals.

* * * * *